United States Patent
Langsenkamp et al.

(10) Patent No.: US 7,558,558 B2
(45) Date of Patent: Jul. 7, 2009

(54) AUTOMATED MOBILE NOTIFICATION SYSTEM

(75) Inventors: Al Langsenkamp, Carmel, IN (US); Kevin McCarthy, Indianapolis, IN (US); Nathan Weinrich, Carmel, IN (US)

(73) Assignee: CML Emergency Services Inc., Gatineau, Quebec (CA)

( * ) Notice: Subject to any disclaimer, the term of this patent is extended or adjusted under 35 U.S.C. 154(b) by 0 days.

(21) Appl. No.: 10/862,742

(22) Filed: Jun. 7, 2004

(65) Prior Publication Data

US 2005/0272412 A1 Dec. 8, 2005

(51) Int. Cl.
*H04M 11/04* (2006.01)

(52) U.S. Cl. ............. 455/404.1; 455/404.2; 455/456.1; 455/412.2; 455/421

(58) Field of Classification Search ............. 455/404.1, 455/404.2, 414.1, 421, 432.3, 433, 456.3, 455/456.1, 515, 458, 404, 412.1, 412.2; 340/286.02, 539

See application file for complete search history.

(56) References Cited

U.S. PATENT DOCUMENTS

| | | | |
|---|---|---|---|
| 4,897,642 A | 1/1990 | DiLullo et al. | |
| 5,121,430 A | 6/1992 | Ganzer et al. | |
| 5,260,986 A | 11/1993 | Pershan | |
| 5,278,539 A | 1/1994 | Lauterbach et al. | |
| 5,436,965 A | 7/1995 | Grossman et al. | |
| 5,448,618 A | 9/1995 | Sandlerman | |
| 5,557,658 A | 9/1996 | Gregorek et al. | |
| 5,719,918 A | 2/1998 | Serbetciouglu et al. | |
| 5,875,404 A | 2/1999 | Messiet | |
| 5,930,717 A | 7/1999 | Yost et al. | |
| 6,021,177 A | 2/2000 | Allport | |
| 6,028,537 A | 2/2000 | Suman et al. | |
| 6,038,438 A | 3/2000 | Beeson et al. | |
| 6,084,510 A | 7/2000 | Lemelson et al. | |
| 6,097,938 A | 8/2000 | Paxson | |
| 6,104,931 A | 8/2000 | Havinis et al. | |
| 6,112,075 A | 8/2000 | Weiser | |
| 6,167,266 A | 12/2000 | Havinis et al. | |
| 6,236,365 B1 | 5/2001 | LeBlanc et al. | |
| 6,295,449 B1 | 9/2001 | Westerlage et al. | |
| 6,347,216 B1 | 2/2002 | Marko et al. | |
| 6,397,054 B1 | 5/2002 | Hoirup et al. | |
| 6,397,076 B1 | 5/2002 | Brown et al. | |
| 6,463,273 B1 | 10/2002 | Day | |
| 6,509,833 B2 * | 1/2003 | Tate | 340/539.1 |
| 6,556,664 B1 | 4/2003 | Langsenkamp | |
| 6,567,504 B1 | 5/2003 | Kercheval et al. | |
| 6,590,507 B2 | 7/2003 | Burns | |
| 6,621,900 B1 | 9/2003 | Rice | |
| 6,710,711 B2 | 3/2004 | Berry | |
| 6,724,861 B2 | 4/2004 | Newland et al. | |
| 6,745,021 B1 * | 6/2004 | Stevens | 455/404.1 |
| 6,792,081 B1 | 9/2004 | Contractor | |
| 6,816,878 B1 | 11/2004 | Zimmers et al. | |
| 6,836,667 B1 * | 12/2004 | Smith, Jr. | 455/456.1 |

(Continued)

*Primary Examiner*—Alexander Eisen
*Assistant Examiner*—Wayne Cai
(74) *Attorney, Agent, or Firm*—Knobbe Martens Olson & Bear LLP

(57) ABSTRACT

A system and method for distributing messages to a plurality of mobile devices within a defined geographic location comprising an automated telephone system used to define a desired distribution area, a remote agent or other identification or positioning device used to identify mobile devices within the defined geographic location, and transmitting a message to the identified mobile devices.

23 Claims, 3 Drawing Sheets

U.S. PATENT DOCUMENTS

| | | |
|---|---|---|
| 6,842,774 B1 | 1/2005 | Piccioni |
| 6,882,708 B1 | 4/2005 | Bedingfield et al. |
| 6,912,270 B1 | 6/2005 | Drury et al. |
| 6,912,271 B1 | 6/2005 | Tuttle |
| 6,947,754 B2 * | 9/2005 | Ogasawara ............ 455/456.3 |
| 2002/0054670 A1 | 5/2002 | Shtivelman |
| 2002/0067806 A1 | 6/2002 | Rodriguez et al. |
| 2002/0136381 A1 | 9/2002 | Shaffer et al. |
| 2002/0178454 A1 | 11/2002 | Antoine et al. |
| 2003/0100326 A1 * | 5/2003 | Grube et al. ............... 455/515 |
| 2004/0132467 A1 * | 7/2004 | Hull et al. .................. 455/458 |
| 2004/0192189 A1 | 9/2004 | Yuhara et al. |
| 2004/0198389 A1 * | 10/2004 | Alcock et al. ............ 455/456.1 |
| 2004/0266398 A1 | 12/2004 | Adamczyk et al. |
| 2005/0003797 A1 * | 1/2005 | Baldwin .................. 455/404.1 |
| 2005/0070247 A1 * | 3/2005 | Larson et al. ............ 455/404.1 |

* cited by examiner

Cell Tower Area

Mobile Notification System

AUTOMATED MOBILE NOTIFICATION SYSTEM

BACKGROUND

I. Introduction

This invention relates to a system and method of identifying and communicating to mobile devices within a designated geographical area.

Automated telephone calling systems have been implemented by governmental authorities and agencies across the country primarily for the purpose of contacting residents in case of an emergency. In practice, these automated systems have typically been implemented to identify and contact residents within a defined geographic area which is considered a potential emergency area. For example, an automated telephone calling system may be utilized to contact all residents within the projected path of a tornado, flood zone, or the hazardous area surrounding a chemical spill. Once a resident within the emergency area is contacted, a pre-recorded, situation specific message is played, encouraging the residents to take cover, evacuate, or take other appropriate measures.

Until recently, the use of automated telephone calling systems has been limited to land line applications. With the advent of wireless communications and an increasingly mobile society, there is a desire to reach the mobile populous in the case of an emergency to the same extent as residents near a landline. Additionally, an automated telephone system capable of alerting mobile device users is applicable to a broader range of situations than those addressed by the land line systems. For example, mobile users could be quickly informed of reported road hazards, construction areas, traffic delays and alternate routes upon traveling into an area near those situations, as well as being informed of the emergencies reported under the current land line systems. Therefore, there is a strong need for an automated telephone calling system for mobile devices. The terms "mobile devices" or "cellular devices" as used herein is intended to encompass all mobile communication devices, including mobile telephones, PDA's pagers, PCS phones, mobile text messaging devices, and all reasonably similar devices utilizing similar technology for mobile communications.

II. Automated Telephone Systems Generally

Automated telephone calling systems have been implemented by many government authorities to automatically contact their citizens in the event of an emergency. Sigma Communications, Inc. ("Sigma") markets an automated telephone calling system under the registered trademark REVERSE 911®. These automated telephone calling systems are used to quickly contact individuals residing in an emergency area and transmit an emergency message (e.g., evacuation, take cover, etc.) to residents of those areas (see U.S. Pat. No. 6,567,504, particularly background, detailed description). For example, automated telephone calling systems are often used by government authorities to contact individuals about the existence of a sited tornado in their area. Automated telephone calling systems typically include mapping software that allows the emergency area to be easily defined. Unfortunately, the automated telephone calls made by these prior art automated telephone calling systems have been limited to land lines, such as those land lines associated with businesses and residences in the emergency area. Individuals who are in the emergency area but do not have access to land lines (e.g., those individuals in automobiles) do not receive the emergency message. Accordingly, it would be desirable to provide an automated phone calling system capable of providing emergency messages to land lines as well as mobile devices.

III. Current Mobile Communication Systems

Modern mobile devices use a cellular network to communicate. This network uses multiple base stations to transmit and relay incoming and outgoing cellular messages which may take the form of voice messages, digital data, pictures, short message service (discussed below), and various other forms of message transmission. Each base station is typically comprised of three antennas, and each antenna services one of three sectors surrounding the base station, as shown in FIG. 1. These three sectors comprise the area in which the base station is capable of transmitting messages to mobile devices.

A. Typical Operation of a Cellular System

A typical mobile communications system (e.g., a cellular system) comprises several base stations transmitting data to and receiving data from cellular devices within its transmission area (a "cell"). The typical mobile communications system further comprises at least one switching office with each switching office associated with a plurality of the base stations. Such systems further comprise a database to identify the mobile devices operating within the system, and mobile devices for communicating to and from the base stations.

Discussing each portion of a system in turn, the base stations of a cellular system are transmitting and receiving towers. Each base station uses three low-power transmitters to transmit signals to and receive signals from mobile devices within its transmission range. Each transmitter is also equipped with an antenna for receiving signals from a mobile device within its range. The effective range of a base station is referred to as a "cell." Each cell can be divided into three sectors ("sectors" or "cellular sectors"), corresponding to the three transmitters, as depicted in FIG. 1, and each sector is defined by sector boundaries 10 as depicted by in FIG. 1. While the boundaries as depicted indicate that a sector consists of a wedge shape comprising one third of a circular transmission area, these boundaries are merely an exemplary model of a cellular transmission perimeter and the corresponding transmitting areas of each of the three transmitters. Another common model of cell sectors is that where transmission boundaries for each base station form a hexagon with a base station at the center of the hexagon, and each sector forms a quadrilateral shaped region such that all cells of the network fit nicely together along the cell boundaries. However, the actual sector shape and transmission boundaries defining any cell take other geometrical shapes or proportions with typically overlapping sectors. The base stations are low-power transmitters, encompassing a relatively small geographic area for each cell. Therefore, a cellular system requires several base stations to ensure that a large geographic area can be covered by a cellular service provider.

A mobile device switches the base station with which it is primarily transmitting as the device moves from one cell to another, requiring a separate device or system to orchestrate the interaction between the mobile device and the several base stations within a particular area. The device responsible for this management is referred to as a "base controller," which is primarily responsible for determining which base station should transmit to the cellular device at any given time, and managing the sequence of switching the base station responsible for the cellular device in operation (sometimes referred to as managing the "hand off" between base stations). In turn, a centralized switching office controls all interaction between the entire system of the service area and other systems operated by other service providers.

When a mobile device is first activated (or powered up), the device monitors a control channel which every base station emits to determine the System Identification Code (SID) emitted by the base station. The SID indicates to the mobile device whether the mobile device is operating on a system controlled by its home service provider or another carrier. If the SID indicates that the system is that of another carrier, the mobile device transmits its authentication information, which includes the identity of its home service provider. This information is transmitted to the local switching office, which adds the device to its database of devices which are operating within its system, but which do not use its system as a home service provider. This information is maintained in a database known as a Visitor Location Registry ("VLR"). The switching office then verifies the authenticity of the information transmitted from the mobile device by contacting the switching office of the mobile device's home service provider. There, the information is compared to a database of mobile devices that use the system as a home service provider a Home Location Registry ("HLR"). If the information is verified, the HLR is updated to indicate the current location of the mobile device so that any incoming messages to the mobile device may be routed to the base station nearest the mobile device, and thereby transmitted to the mobile device. Similarly, the VLR is updated to indicate that the mobile device is authorized to use the system in which it is operating, allowing the mobile device to send outgoing messages. These databases are constantly updated, tracking the sector where the mobile device is located as long as the device remains powered up, by monitoring the strength of reception of specific antennas of the base station(s) that is/are being used to communicate with the device. Therefore, the specific sector of the cell where the mobile device is currently located can be identified by the registers.

B. Various Devices and Methods for Receiving Mobile Messages

As briefly discussed above, messages can be transmitted in various forms via mobile devices. Verbal or other audible messages may be transmitted through cellular or digital phones or other suitable devices such as advanced PDA's or wireless equipped laptop computers. Additionally, text messages may be sent via a method known as Short Message Service ("SMS"), on devices capable of receiving this type of transmission. SMS allows for short text messages to be sent to and from a mobile device (e.g., a mobile phone, PDA, etc.), and operates in much the same fashion as cellular telephony. However, an SMS system further comprises a Short-Message Service Center ("SMSC") which is a combination of hardware and software responsible for the relaying, storing, and forwarding of a short message between SMS devices through the cellular system. Therefore, SMS capable devices operate by utilizing an existing cellular network as described above, but further require the use of an SMSC to facilitate the transfer of SMS messages to and from mobile SMS devices.

Moreover, and in addition to voice and text, another form of communication that can be transmitted to and from mobile devices includes the data packet. Data packets may include, but are not limited to, relevant information such as:

1. Warning area description;
2. Description of warning;
3. Recommended actions;
4. Warning level;
5. Road conditions;
6. Weather conditions; and
7. Traffic information.

As discussed more fully in the summary and description sections herein, data packets are particularly useful in embodiments of the invention where the mobile devices are intelligent, i.e., embedded software in the mobile device allows it to analyze data packet information and through trending of GPS or other equivalent data, determine the appropriate action in response to the information received in the data packet. Data packets can be transmitted via multiple types of transmission mechanisms including but not limited to SMS, TCP/IP, IBM-MQ, HTTP, SOAP, JMS or other equivalent protocols.

Indeed, many people have access to mobile devices with SMS service, and a large portion of the population now owns a cellular phone of some description. If a message could be sent to these persons in an emergency situation, those individuals could take the proper precautions, and more lives could be saved. Accordingly, there is a need for a method of identifying and contacting mobile devices in an emergency area when an emergency message is distributed to that area. The present invention contemplates integration of automated telephone calling systems with the far reaching abilities and two-way transmission capabilities of SMS and other means of wireless communication, such as wireless communication via transmission mechanisms such as TCP/IP, IBM MQ, HTTP, SOAP, JMS and other equivalents.

IV. Current Mobile Warning Systems

Previously proposed technology for mobile warning systems only provides for transmitting a signal to all devices within range of a cellular station which coincides with an identified emergency area. Further, these previously proposed systems suggest that base stations within an emergency area should be used to transmit a predetermined signal to activate distributed warning devices within the transmission area, producing a generalized warning from the activated device which is specially adapted to receive the signal and activate a warning. In particular, the warnings contemplated by the previously proposed systems consist of a predetermined audible alarm similar to a smoke detector alarm, or the activation of a radio receiver to tune into a pre-selected emergency station. Therefore, the warning generated to the general public, at best, simply alerts the recipients of a threat somewhere within the transmission area of the base station activated, with the possibility that the recipients might be further apprised through a radio network. This technology bears a striking resemblance to the traditional emergency siren used in many communities to indicate the presence of a tornado or similar emergency, and falls prey to many of the same shortcomings, including the lack of specific information regarding the threat involved, the requirement of distributing new warning devices to all those who need to be contacted, and the potential for contacting individuals not located within an identified emergency area.

Rather than simply emitting a generalized warning, it would be preferable for an emergency system to tailor the message relayed to mobile devices within an identified emergency area so that detailed instructions for a particular situation could be generated. By having the capability of creating a new message for each identified emergency (a "situation specific" message), the individuals reached by the emergency transmission could be directly informed of the nature of the emergency, the severity of the emergency, and the current geographic boundaries of the emergency area. Therefore, those individuals informed by a situation specific message would be more fully informed of the situation, and more likely able to make an informed decision regarding how to further proceed to best insure their safety. Additionally, those individuals not within the emergency area could be given sufficient notice and information regarding the emergency area so that they could (1) take steps to avoid the emergency area, (2) realize that the warning does not pertain to them, or (3) take another appropriate response. Therefore, the ability to generate situation specific messages to individuals within an identified area is preferable.

In addition, the previously proposed technology requires the distribution of warning devices which are specifically programmed to respond to the transmission of a specific signal. By requiring the general public to obtain a device not already in their possession, either the projected number of individuals who might be reached by the transmission of an emergency signal is reduced, or the cost for implementing such a system is dramatically increased. By contrast, it would be preferable to utilize a device, class of devices, or a number of different types of devices which are already in use by the consuming public as the warning device so that a greater number of potential individuals might be notified in the case of an emergency (or other situation) and the system can be implemented with a lower cost.

Finally, current warning systems transmit a warning signal to the full extent of the transmission area of any base station identified to be within the emergency area. Because the transmission area of the transmitting base stations is likely to substantially exceed the boundaries of the emergency area, it is likely that a substantial number of individuals carrying a warning device would receive a general warning signal even though they were neither within nor traveling toward an emergency area. Therefore, it is advantageous to have a means of more accurately defining an area of transmission so that the number of individuals unnecessarily contacted by an emergency warning is reduced.

Therefore, it is advantageous to provide a system that addresses the shortcomings inherent in the previously proposed systems. In particular, the identification of mobile devices within a designated area, and a means for an administrator to send a message tailored for each instance requiring notification (a "situation-specific message") to each mobile device identified within that area would be beneficial. Additionally, allowing for increased specificity of the geographic identification, and the ability to tailor messages sent to the mobile devices within that location would cause urgent communications to be more clear, complete, and reliable. The ability to constantly tailor the system further increases the applicability of a mobile notification system to other uses that are not currently available. For example, the ability to generate messages to mobile devices within a geographic area could have a wide range of applicability, from informing travelers of alternate routes in the event of vehicle crashes, a chemical spill, or road construction delays within a particular area, to being used in connection with a subscriber database to send messages regarding current local cultural or retail activities or points of interest when a subscribing mobile device enters into the boundaries of a city. Therefore, improvements over the current technology would not only improve upon current emergency notification systems, but would also present useful embodiments to other notification applications.

SUMMARY

One method of distributing messages to mobile devices (cellular phones, PDA's, pagers, etc.) which are part of an existing cellular network comprises four steps. First, a desired message distribution area is defined. Then, a larger distribution area (an "expanded message distribution area") is identified as the area defined by the boundaries of all base station sectors which contain a portion of the defined message distribution area. Next, all active mobile devices within that expanded message distribution area are identified, and a message is transmitted to those identified mobile devices. "Active" mobile devices are those mobile devices that are turned on an in communication with the base station. Additionally, identification of the devices within the expanded distribution area may be accomplished by utilizing a software program. Finally, the software may be in communication with a switching office which controls the system operating any base tower which contains a sector encompassing a portion of the message distribution area.

Another method of distributing messages to a plurality of mobile devices which are part of an existing cellular network comprises at least three steps. First, a desired distribution area is defined. Second, the transmission area perimeter of all base stations encompassing at least a portion of the message distribution area is identified, and situation-specific messages are transmitted to the mobile devices within the perimeter of those identified base stations. Third, the base station sectors encompassing a portion of the distribution area can be identified, and messages may be transmitted only to mobile devices within the identified sectors. In an alternative embodiment, before situation specific messages are transmitted to the mobile devices, a communication is delivered to each device asking whether the mobile device is indeed within the desired distribution area. Each mobile device equipped with a global positioning system or equivalent may then confirm its presence within the desired distribution area back to the base station. Once confirmation is received, the situation specific message is delivered to the mobile device. In yet another alternative embodiment, mobile devices could be programmed to periodically report their positions to respective base stations. These reported positions may then be used to identify which of those mobile devices within the expanded distribution area actually fall within the desired distribution area. Once the global positioning system is used to identify which mobile devices are actually within the desired distribution area, a message is transmitted to those identified mobile devices actually within the desired distribution area.

The system of distributing messages to mobile devices comprises an automated calling system which is used to define an area in which persons should be notified, and to further contact mobile devices identified within the defined area. If the invention is used to distribute emergency warnings, for example, the mapping device of the automated calling system or equivalent would circumscribe the area affected by the emergency and identify the corresponding sectors of the base stations serving the circumscribed area. Additionally, the system should include at least one identifying device operable to acquire identification data of mobile devices within the defined area. The identifying device serves to determine what mobile devices are within the circumscribed area, and may take the form of a remote agent which is a software program operable to query a switching center to determine what mobile devices are active within the identified sectors of stations serving the defined area. In an alternative embodiment, the mobile devices themselves could determine if they are in the defined area. For example, mobile devices outfitted with GPS receivers could receive emergency warnings for an emergency area, the mobile devices could then determine if the emergency warning is relevant based upon the location of the warning device, and then notify the user of the mobile device if the emergency warning is relevant.

Furthermore, the method of distributing messages to a number (plurality) of mobile devices in an existing cellular network is carried out first by defining a desired message distribution area. Typically, determining the distribution area will be influenced by the geographic proximity to an event, situation, or location believed to be important to potential recipients within an area. Next, an expanded message distribution area is defined based on the ability of the system to precisely identify the location of mobile devices within the desired message distribution area. That may be accomplished through the ability of the base station and switching office to identify mobile devices within each sector of a base station, or it may be accomplished through the use of other positioning methods or devices.

Yet another embodiment of the current invention comprises a system of distributing messages to a number of mobile devices comprising an automated calling system which is used to define a message distribution area. Additionally, a short message service center operable to send short message service messages to applicable mobile devices is utilized to receive and send short message service messages to the devices. A remote agent, which may take the form of a software program in contact with the automated calling system and the short message service center, acts to identify mobile devices within the message distribution area. Additionally, the system may be operable to send short message service communications to the identified mobile devices. Furthermore, the system may query individual mobile devices utilizing a global positioning system to determine if the mobile devices are actually within the message distribution area. A message is then transmitted to those mobile devices that confirm their presence within the message distribution area.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
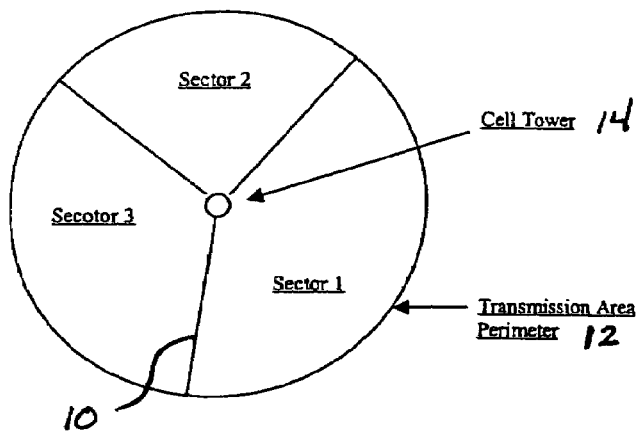
FIG. 1 shows a diagram depicting the effective range of a cellular base station, further depicting the three transmission sectors of each base station.

With reference to FIG. 1, a base station's effective transmission area (defined by the transmission area perimeter 12) is divided into three sectors, corresponding with three transmission antennas located on each base station (or cell tower 14). The combined transmission areas of the transmission antennas comprise the overall transmission area of the base station (a "cell"), but each mobile device operating within the transmission area of the base station is identified as operating primarily within one of the sectors. Each sector is defined by a boundary 10 and a transmission area perimeter 12, creating a sector represented in the shape of a wedge for purposes of this example. However, the actual geometry of a sector and the true location of each boundary may take different forms in reality. Therefore, the location of each mobile device can be pinpointed to the sector of the base station within which it resides if the mobile device is powered up.

Figure 2:
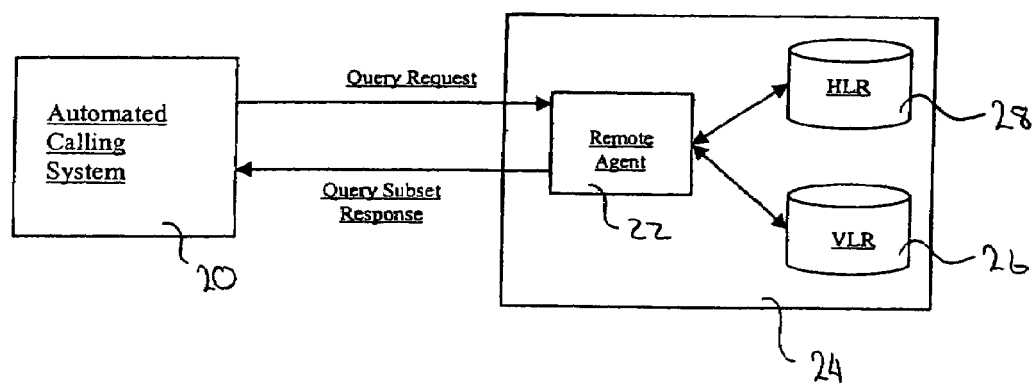
FIG. 2 shows a diagram depicting the interface between an automated telephone calling system and a remote agent, in this instance the remote agent being a Short Message Service Center.
Figure 4:
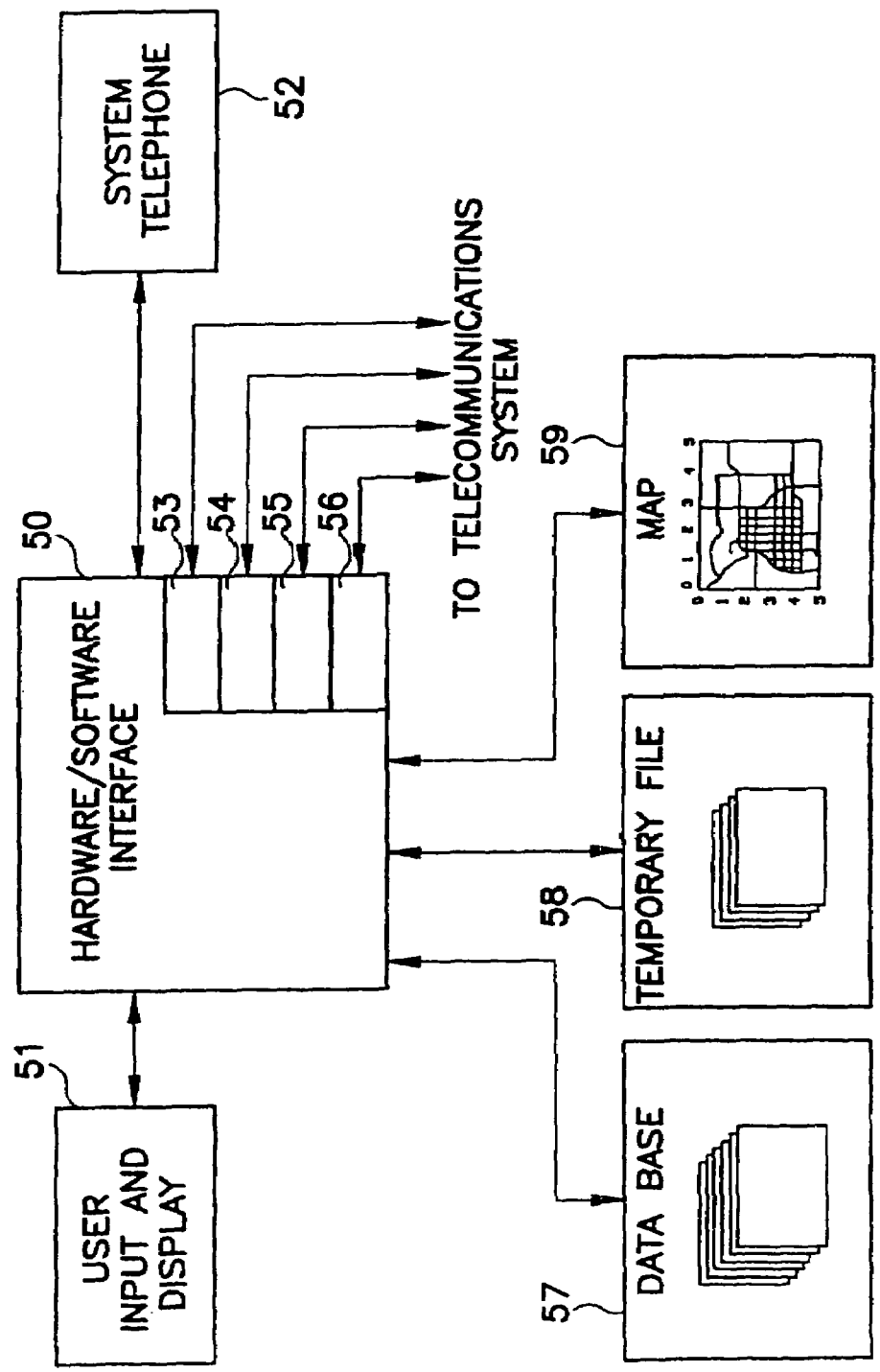
FIG. 4 shows a diagram depicting elements comprising an automated calling system.

With reference to FIG. 2, an exemplary embodiment of an automated notification system includes an automated telephone calling system 20, and a remote agent 22 located in communication with switching office 24. A representative automated calling system is described in U.S. Pat. No. 6,567,504, which is incorporated herein by reference. However, it can be generally stated that an automated calling system generally comprises a hardware/software interface 50, a user input and display 51, a system or telecommunications interface 53-56, a database 57, a temporary file 58, and a software driven mapping device 59 as indicated by FIG. 4. In function, the automated calling system is operable to define a geographic locality or area for message distribution using the mapping device and automatically distribute messages to those devices identified as existing within the defined area by the remote agent 22.

The automated calling system 20 communicates with the remote agent 22 by sending parameters defining a geographic distribution area to the remote agent, typically through a network connection (e.g., the Internet) or a dedicated line (e.g., a phone line). The desired message distribution area is a geographic area with parameters defined by the automated calling system or any equivalent system with mapping capabilities, including mapping systems that may include, for example, the ESRI mapping system or the MAP INFO mapping system. For example, the desired distribution area may be defined by a zip code area, a quadrilateral defined by four longitude/latitude positions, an area bounded by a number of city streets, all geographic locations within a given distance of a particular point, or any other number of methods for defining a desired message distribution area. Such methods are well-known in the art through the use of software-driven mapping devices.

The remote agent 22 is a software program capable of acquiring a list of mobile devices located in the distribution area defined by the automated calling system 20. In one embodiment of the present invention, the remote agent can accomplish this task by identifying the base station sectors which contain any portion of the distribution area (the "expanded distribution area"). Thus, the expanded distribution area is defined by the boundaries of one or more adjacent base station sectors which encompass at least a portion of the defined distribution area. Adjacent base station sectors are those which touch, overlap, or are generally not separated by another base station sector. Once the extended distribution area is defined, the remote agent identifies the mobile devices active within that area. To this end, the remote agent 22 queries the VLR 26 and HLR 28 (to which the remote agent is typically connected via a network connection or telephone line) within the switching office responsible for the area encompassed within the expanded distribution area. The VLR 26 and the HLR 28 then return a list of all active mobile devices along with data regarding those devices within the defined area to the remote agent 22. The remote agent 22 compiles a list of all mobile devices, including device IDs (e.g., telephone numbers) within the expanded distribution area. This device identification data (including telephone numbers) is then sent back to the automated calling system 20. From this returned list, the automated calling system 20 then distributes messages to the mobile devices in the distribution area. In particular, the automated calling system uses the mobile device identification data received from the remote agent 22 to place a call or send another form of message to each mobile device in the expanded distribution area.

As an example of the above, consider an automated calling system having a telecommunications interface that is connected to a telecommunications system and thereby connected to a cellular network. As discussed above, the automated calling system is operable to identify the distribution area 30 shown in FIG. 3 to receive an emergency message. This distribution area (the emergency area) is passed on to the remote agent 22. After receiving the defined distribution area, the remote agent 22 determines that the defined distribution area 30 falls within the range of base stations 32 and 33. In particular, the remote agent determines that distribution area 30 falls within sectors 32(*b*) and 32(*c*) of base station 32 and sector 33(*a*) of base station 33. The remote agent then queries the HLR 28 and VLR 26 to retrieve a list of active mobile devices in these sectors 32(*b*), 32(*c*) and 33(*a*), (the "expanded distribution area" as shown by the cross-hatching in FIG. 3). Upon response from the HLR 28 and VLR 26, the ID's for these mobile devices are listed by the remote agent and returned to the automated calling system. At some point, the user of the automated calling system uses the user input and display to enter the emergency message into the memory of the system. The automated calling system 20 then sends a message to each of the mobile devices in the expanded distribution area by communicating the IDs of the mobile devices returned from the agent.

From the above example, it is apparent that contacting all mobile devices within the expanded distribution area will result in mobile devices being contacted that are not actually within the distribution area. This slight overstating of the distribution area is an acceptable margin for error to insure that all mobile devices within the distribution area actually receive the message. Furthermore, the expanded distribution area can serve as a safeguard if the automated notification system is used as an emergency notification system, as the slight overstatement merely notifies mobile devices that might soon be traveling into the emergency area.

Figure 3:
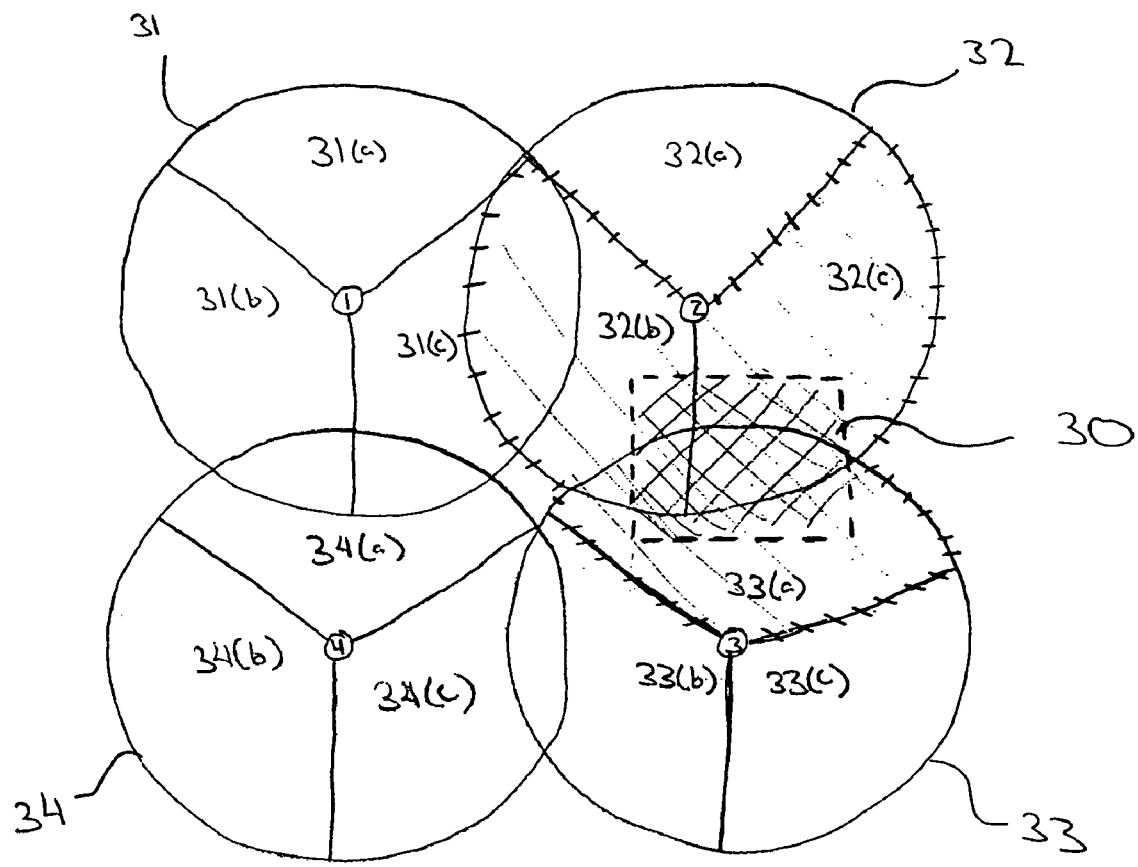
FIG. 3 shows a diagram depicting the effective range of four separate cellular base stations, the individual sectors of each base station.

Yet another embodiment of the present invention involves the use of an automated calling system which identifies the distribution area 30 shown in FIG. 3. This distribution area is passed on to the remote agent 22. After receiving the defined distribution area, the remote agent 22 determines that the defined distribution area 30 falls within the range of base stations 32 and 33. In particular, the remote agent determines that distribution area 30 falls within sectors 32(*b*) and 32(*c*) of base station 32 and sector 33(*a*) of base station 33. The remote agent then queries the HLR 28 and VLR 26 to retrieve a list of active mobile devices in these sectors 32(*b*), 32(*c*) and 33(*a*), (the "expanded distribution area" as shown by the cross-hatching in FIG. 3). Upon response from the HLR 28 and VLR 26, the ID's for these mobile devices are listed by the remote agent and returned to the automated calling system. The automated calling system 20 then sends an SMS message to each of the mobile SMS devices in the expanded distribution area by generating a text message, data packet or other equivalent and sending it to the SMSC to forward to the identified mobile SMS devices returned from the agent.

In addition to the above, it should be noted that geographic position self-awareness of mobile devices is becoming more predominant and more precise, and as of Oct. 1, 2001, the Federal Communications Commission has implemented requirements mandating more exact locations of a particular cellular phone to be ascertainable for purposes of allowing emergency and rescue personnel to find a particular caller which has called 911 or another emergency number. Utilizing this technology in an alternative embodiment of the invention, the remote agent compiles a list of mobile devices to be contacted based on the longitude and latitude of the mobile device (instead of its sector location within a given base station's transmission area) as determined by the GPS receiver within the mobile device. This embodiment will allow for further determination of a mobile device's exact location. Under this embodiment of the present invention, a global positioning receiver within the mobile device would transmit the coordinates of a mobile device. Accordingly, either the remote agent or automated calling system is further adapted or further connected to a global positioning agent to identify the mobile devices within the distribution area. In an alternative embodiment of the present invention, a global positioning system is used or included in association with the remote agent or the automated calling system to identify which mobile devices identified within the extended distribution area are actually within the smaller actual distribution area. By utilizing the precision of the global positioning system as described above, the subset of identified devices are further refined to reduce the slight overstatement of the actual distribution area described above.

Another exemplary embodiment of the invention using GPS technology takes advantage of the fact that mobile devices themselves are becoming very smart and are even Java enabled, with significant computing power. In this embodiment, the mapping device of the automated calling system or other equivalent mapping device is used to define a desired message distribution area, such as an emergency area. The VLR and HLR are consulted to determine all mobile devices that are in sectors that make up part of the desired message distribution area. Thereafter, the mobile devices in these sectors are individually called or contacted with a communication that provides coordinates defining the desired message distribution area (e.g., coordinates that define the polygon of the emergency area), and requesting a response concerning whether each mobile device is actually within the desired message distribution area. These individual calls or contacts are made using the unique identification (e.g. telephone number) associated with each mobile device. Of course, additional information other than the desired message distribution area may also be transmitted in the communication to the mobile devices, such as the direction of storm travel, urgency of the message, road conditions, other weather conditions, traffic information, description of warning, etc. After receiving this information, each mobile device receiving the communication uses GPS technology to pinpoint its exact location and determines if it is within the desired message distribution area. The mobile devices then provides a response to the cell tower indicating whether or not the mobile device is within the message distribution area. Using the information in each response, the system then individually calls or contacts each mobile device that has indicated its current location is within the desired message distribution area and delivers the message to that device (whether the message is text, voice, tone, data packet, or other). Each mobile device then presents the message to its user.

In still another embodiment of the invention using GPS technology, an even broader attempt is made to contact mobile devices within a desired message distribution area. According to this embodiment, a message, such as an emergency message or other situation-specific message, is created and associated with the emergency area. All cell towers having a transmission area that comprise a portion of the defined emergency area are instructed to transmit a general communication receivable by all mobile devices within the transmission area of the tower. This communication contains the coordinates of the polygon defining the emergency area and the associated emergency message to the mobile devices within the transmission area of the cell towers. Of course, additional information may also be transmitted in the communication to the mobile devices, such as the direction of storm travel, urgency of the message, road conditions, other weather conditions, traffic information, description of warning, etc. The mobile devices receiving the transmitted communication use GPS technology to determine if they are within the polygonal area that is the emergency area. If a particular mobile device is within the emergency area, that mobile device informs its user that a message has been received, and presents the associated situation-specific message to its user. Presentation of the message is in accordance with the format of the message (e.g., the message may be presented as voice, text, tone, data packet or any other format). On the other hand, if the mobile device is not within the emergency area, the message is not presented to its user.

Yet another example of an exemplary embodiment of the invention using GPS technology adds further features to the systems described in the preceding paragraphs where individual mobile devices via embedded software determine if they are within the emergency area before presenting the emergency message to their user. In this embodiment, each mobile device maintains a log or other equivalent of recent positions for trending purposes. With this trending information, mobile devices can anticipate general areas where it is likely the device will travel in the near future. Accordingly, if an emergency message or other situation-specific message is sent that is associated with an emergency area that the mobile device is not currently in, but is likely to travel to in the very near future based on recent trending information, the mobile device could present the emergency message to that user with a warning stating that the user is headed for the emergency area.

Conversely, if the trending information indicates that the mobile device will soon travel out of the emergency area, the mobile device could either not present the emergency message, or present the emergency message and state that the user will soon pass out of the emergency area. Even though this particular embodiment of the invention and others involving intelligent mobile devices anticipates that the communication with the mobile device could be SMS text, voice or other equivalent format, the use of data packet technology or equivalent communication technology is especially appropriate. The data packet could provide a wide variety of information including but not limited to warning area description, description of warnings, recommended actions, warning level, road conditions, weather conditions, or traffic information. In addition to SMS, data packets can be transmitted via multiple mechanisms including TCP/IP, IBM MQ, HTTP, SOAP, JMS or other equivalent protocols.

In yet another alternative embodiment of the invention, each mobile device includes an applet program capable of providing a reply to an emergency message. For example, the reply could be an automatic reply from the mobile device that simply indicates that the mobile device is in the emergency area or is not in the emergency area. Furthermore, the reply could be generated from the user to indicate that the user is in need of assistance or other appropriate reply.

In each embodiment of the invention; updating of the emergency area along with periodic re-transmission of the emergency message is anticipated. For example, if the emergency message deals with a fast moving tornado or other weather system, the defined emergency area may need to be updated every five or ten minutes. Also, because mobile devices are constantly moving, with mobile devices moving into and out of the emergency area, any emergency message distributed to the emergency area is typically retransmitted at regular intervals (e.g., once a minute). In these situations, the mobile devices may contain applets capable of disregarding an emergency message if it was recently presented to the user of the mobile device (e.g., within the past ten minutes).

One system for distributing messages to multiple mobile devices in an existing cellular network comprises an automated calling system having a mapping device or equivalent system having mapping capability which is used to define a desired message distribution area, and at least one identifying device which is used to obtain identification data about mobile devices operating within the defined message distribution area. The above system could further comprise an automated calling system or equivalent to contact each of the identified devices located within the defined area. Further, a remote agent could be used to identify the mobile devices within the defined area. Additionally, a system comprising a remote agent could further comprise a visitor location register for identifying the mobile devices which are within the defined area but not in their home area, and a home location register for identifying mobile devices within the defined area. Finally, the system could utilize global positioning technology to either identify mobile devices within the desired message distribution area or allow mobile devices themselves to determine if they are within the desired message distribution area.

Another system of distributing messages to multiple mobile devices in an existing cellular network comprises an automated calling system or other system having mapping capabilities which is used to define a message distribution area, a short message service center operable to send short message service communications, and a remote agent which is used to identify mobile devices within the cellular sectors encompassing the message distribution area. The system could further comprise an automated calling system operable to send short message service communications (text, data packet or other equivalent) to mobile devices through the short message service center. Additionally, the system could further utilize global positioning technology to either identify those devices which are actually within the defined message distribution area or allow devices themselves to determine if they are within the defined message distribution area. The devices, through embedded software, could determine whether an emergency message or other situation-specific message should be displayed to its user.

Further, the above embodiments can contain the option of allowing the owners of mobile devices ("mobile subscribers") to opt in or out of the notification service. The mobile subscribers could be contacted by the automated calling system operator to allow the mobile subscribers to determine under what circumstances the mobile subscriber would like to be notified. For example, if the mobile subscriber would prefer to be notified only in the case of weather emergencies but not road emergencies or road closings, the database 57 could be updated to contact the mobile subscriber only when weather emergencies are reported in her area.

Although the present invention has been described in considerable detail with reference to certain preferred versions thereof, other versions are possible, such as integrating the remote agent and the automated calling system so that the automated calling system is operable to interact with the switching office, or utilizing an alternate positioning system to identify those mobile devices within the distribution area. Therefore, the spirit and scope of the appended claims should not be limited to the description of the preferred versions contained herein.

What is claimed is:

1. A system for distributing a warning message to at least one mobile device user in a cellular network, the system comprising:
   an automated calling system having a mapping device operable to define a geographic message distribution area of the warning message, the automated calling system further operable to send the warning message;
   at least one cell tower having a plurality of sectors for transmitting information between the automated calling system and one or more mobile devices about the geographic message distribution area and the warning message;
   at least one processor operable to determine which individual cellular tower sectors encompass at least a portion of the geographic message distribution area, said at least one processor being further operable to identify at least one of the mobile devices in communication with at least one of said individual cellular tower sectors and to send the warning message and geographic information defining the message distribution area to only the at least one of the mobile devices in communication with the identified cellular tower sectors;
   wherein the at least one mobile device is operable to:
      receive the warning message and the geographic information defining the message distribution area,
      determine if the location of the at least one mobile device is within the geographic message distribution area,
      and wherein the at least one mobile device is further operable to present the warning message to the at least one mobile device user if the at least one mobile device determines that the location of the at least one mobile device is within the geographic message distribution area.

2. The system of claim 1 wherein the at least one mobile device is further operable to determine if trend information for the mobile device indicates that the mobile device will enter the message distribution area.

3. The system of claim 1 wherein the automated calling system periodically retransmits over the at least one cell tower the information about the message distribution area and the message.

4. The system of claim 1 wherein the at least one mobile device is operable to transmit a reply in response to the information about the message distribution area, the reply indicating whether or not the at least one mobile device is in the message distribution area.

5. The system of claim 4 wherein the reply indicates whether the mobile device user is in need of assistance.

6. The system of claim 1 wherein the message is a situation-specific message.

7. The system of claim 6 wherein the message distribution area is an emergency area, and the message is an emergency message.

8. The system of claim 1 wherein the at least one mobile device uses global positioning information to determine if the mobile device is located within the message distribution area.

9. The system of claim 1 wherein the at least one cell tower transmits the information about the message distribution area by individually contacting active mobile devices in the transmission range of the cell tower.

10. The system of claim 9 wherein the at least one mobile device is operable to transmit a reply in response to the information about the message distribution area, the reply indicating whether or not the at least one mobile device is in the message distribution area.

11. The system of claim 10 wherein the at least one cell tower transmits the message by individually contacting each mobile device that transmits a reply indicating that the mobile device is in the message distribution area.

12. The system of claim 1 wherein the one or more mobile devices is further operable to send a distress transmission upon receipt of the message.

13. A method of distributing a warning message to a plurality of mobile devices in a cellular network having a plurality of transmission towers with each tower distributing the message to receivers located within at least one individual sector, the method comprising the steps of:
   defining a geographic distribution area for a warning message to be distributed by an automated calling system;
   determining which of the individual sectors of the transmission towers are included sectors such that they encompassed at least a portion of the geographic distribution area of the message;
   identifying one or more mobile device in communication with a transmitter associated with at least one of the included sectors;
   transmitting the warning message and geographic information about the distribution area of the message from the automated calling system through one or more of the plurality of transmission sectors to the one or more mobile device identified to be in communication with a transmitter associated with at least one of the included sectors;
   receiving the warning message and geographic information about the distribution area of the message on at least one or more of the identified mobile devices;
   using global positioning information received by the at least one of the mobile devices to determine if the at least one of the one or more of the mobile devices identified to be in communication with at least one of the included sectors is a target device such that it is located within the geographic message distribution area; and
   presenting the warning message based on the determination that the at least one of the devices is a target device.

14. The method of claim 13 further comprising the step of periodically retransmitting the message and the information about the message distribution area.

15. The method of claim 13 further comprising the step of transmitting a reply from one or more of the plurality of mobile devices in response to the information about the message distribution area, the reply indicating whether or not the one or more of the plurality of mobile device is in the message distribution area.

16. The method claim 13 wherein the reply indicates whether the mobile device user is in need of assistance.

17. The method of claim 13 wherein the message is a situation-specific message.

18. The method of claim 17 wherein the message distribution area is an emergency area, and the message is an emergency message.

19. The method of claim 17 wherein the step of transmitting information about the message distribution area to the plurality of mobile devices is achieved by contacting each individual mobile device that is active within the transmission range of the one or more of the plurality of transmission towers.

20. A method of distributing a warning message to one or more identified mobile devices in a cellular network, the method comprising the steps of:
   defining a geographic message distribution area of the warning message using an automated calling system, the automated calling system comprising a mapping device;

identifying specific transmission sectors within the cellular network that contain any portion of the geographic message distribution area by comparing the message distribution area with the location of the cellular network transmission sectors;

identifying mobile devices in communication with the transmission sectors wherein said identifying of said mobile devices is accomplished by a remote agent which queries a visitor location register to identify said mobile devices within the message distribution area which are not in a home area and which queries a home location register for identifying said mobile devices within the geographic message distribution area which are in a home area, said remote agent being a telecommunications interface between the automated calling system and the cellular network;

transmitting at least one message and geographic information about the distribution area of the message to the at least one mobile device, said at least one mobile device including global positioning system circuitry and software;

verifying by the one or more identified mobile devices, whether the one or more identified mobile devices identified to be in communication with at least one of the included sectors is a target device such that it is located within the geographic message distribution area;

transmitting a message from the one or more identified mobile devices acknowledging that it is located within the geographic message distribution area; and transmitting one or more warning messages and geographic information about the message distribution area to the one or more active mobile devices.

21. A method of distributing warning messages to one or more identified mobile devices in a cellular network, the method comprising the steps of:

defining a geographic distribution area for a warning message to be distributed by an automated calling system, the automated calling system comprising a mapping device;

identifying specific transmission sectors within the cellular network that contain any portion of the geographic distribution area of the message by comparing the geographic distribution area of the message with the location of the cellular network transmission sectors;

identifying mobile devices in communication with the transmission sectors whereby said identifying of said mobile devices is accomplished by a remote agent which queries a visitor location register to identify said mobile devices within the message distribution area which are not in a home area and which queries a home location register for identifying said mobile devices within the message distribution area which are in a home area, said remote agent being a telecommunications interface between the automated calling system and the cellular network;

transmitting at least one warning message and geographic information about the message distribution area to the one or more identified mobile devices, said one or more identified mobile devices including global positioning system circuitry and software;

verifying by the one or more identified mobile devices, whether the one or more identified mobile devices identified to be in communication with at least one of the included sectors is a target device such that it is located within the geographic message distribution area;

displaying the warning message on the one or more identified mobile devices.

22. The method of claim 21 further comprising the step of determining, by the one or more mobile devices, whether it is likely to enter the message distribution area.

23. The method of claim 13 wherein the reply that the message was received comprises a distress signal including the location of the mobile device from each mobile device receiving the message.

* * * * *

UNITED STATES PATENT AND TRADEMARK OFFICE
CERTIFICATE OF CORRECTION

PATENT NO. : 7,558,558 B2
APPLICATION NO. : 10/862742
DATED : July 7, 2009
INVENTOR(S) : Al Langsenkamp, Kevin McCarthy and Nathan Weinrich Page 1 of 1

It is certified that error appears in the above-identified patent and that said Letters Patent is hereby corrected as shown below:

On the Title Pg. Item (73), which reads, "CML Emergency Services Inc., Gatineau, Quebec (CA)" should read -- Plant Equipment Inc. dba PlantCML, Temecula, California (US) --

Signed and Sealed this

Twenty-second Day of September, 2009

David J. Kappos
*Director of the United States Patent and Trademark Office*